I. HUPP.
FLEXIBLE COUPLING.
APPLICATION FILED MAR. 15, 1918. RENEWED JULY 21, 1919.
1,334,537.
Patented Mar. 23, 1920.
2 SHEETS—SHEET 1.
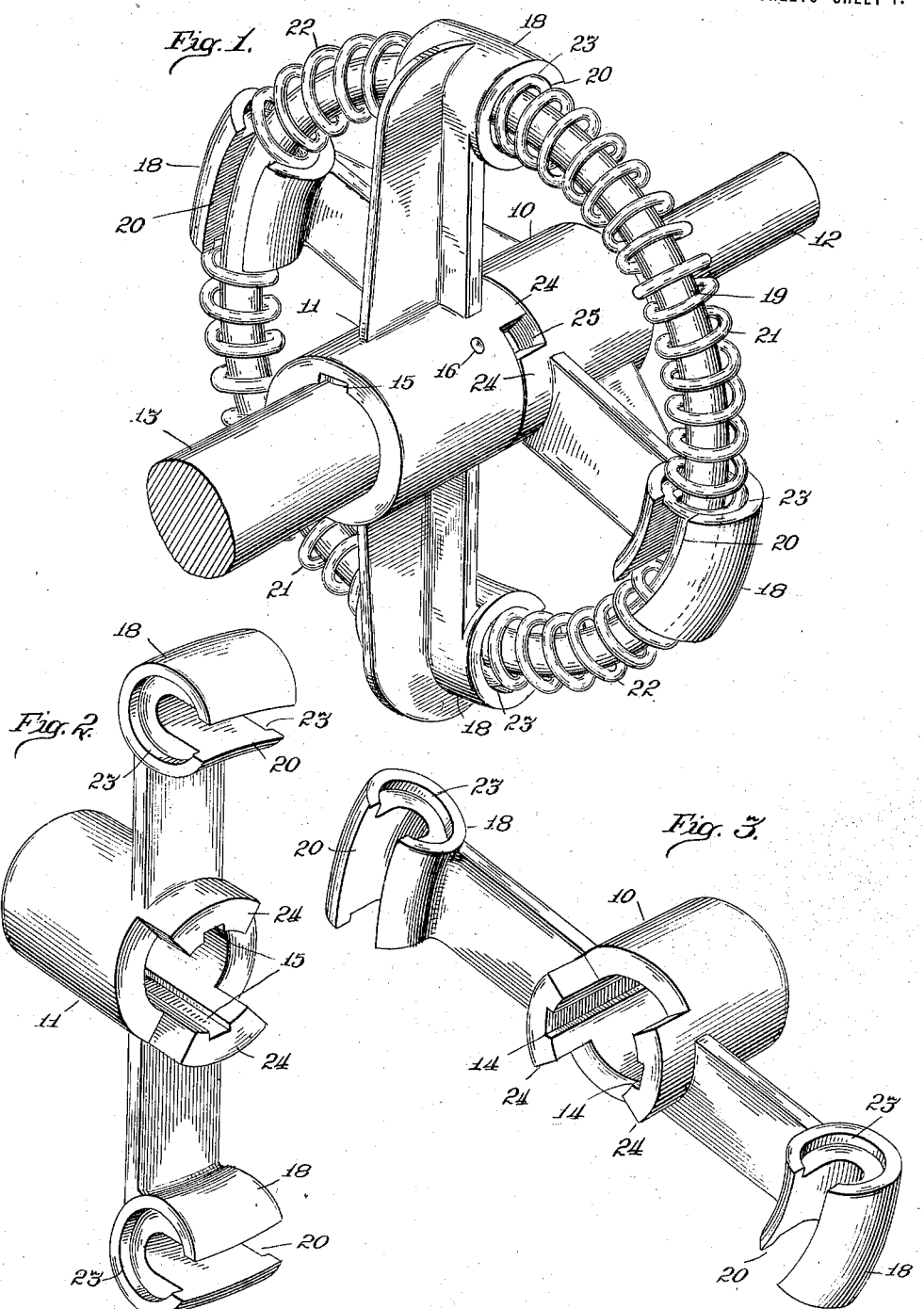

I. HUPP.
FLEXIBLE COUPLING.
APPLICATION FILED MAR. 15, 1918. RENEWED JULY 21, 1919.
1,334,537.
Patented Mar. 23, 1920.
2 SHEETS—SHEET 2.
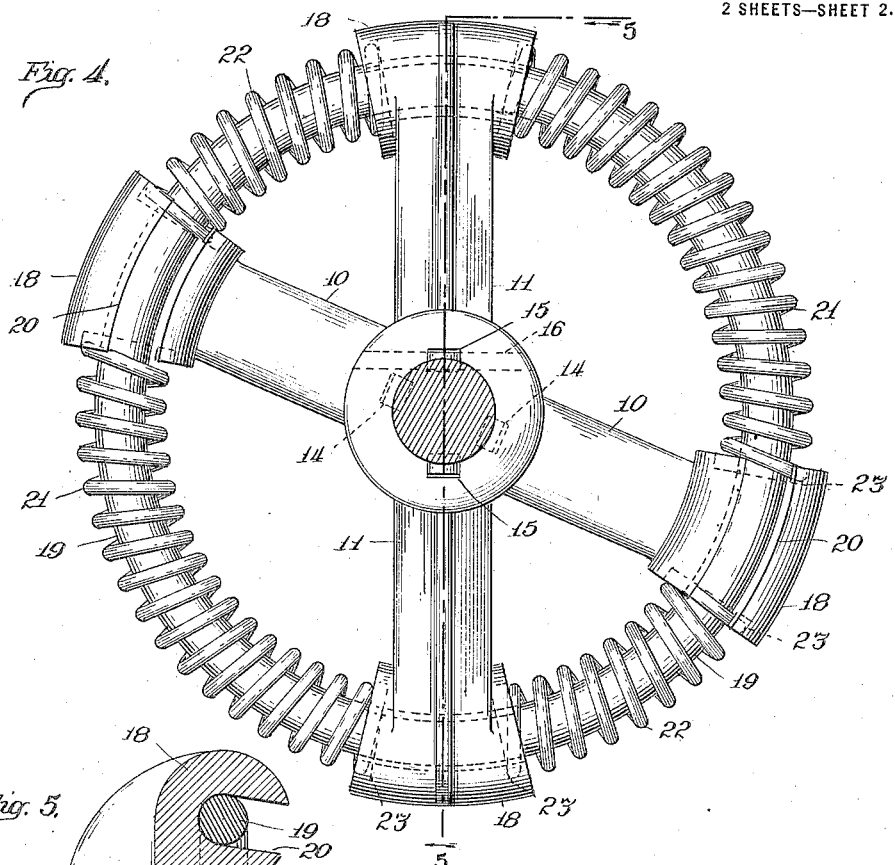
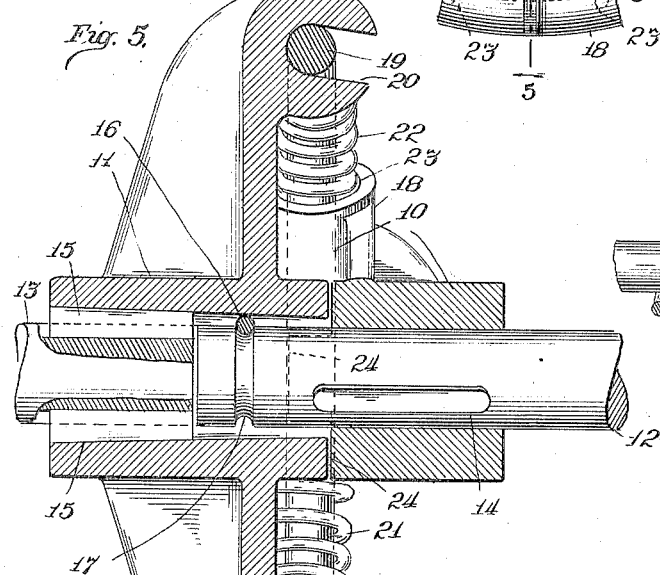
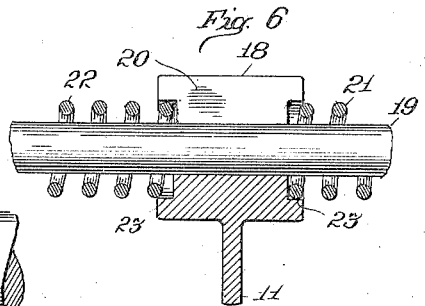

UNITED STATES PATENT OFFICE.

IRVIN HUPP, OF CHICAGO, ILLINOIS, ASSIGNOR TO HUPP, INCORPORATED, A CORPORATION OF ILLINOIS.

FLEXIBLE COUPLING.

1,334,537.  Specification of Letters Patent.  Patented Mar. 23, 1920.

Application filed March 15, 1918, Serial No. 222,535. Renewed July 21, 1919. Serial No. 312,272.

*To all whom it may concern:*

Be it known that I, IRVIN HUPP, a citizen of the United States, and a resident of Chicago, in the county of Cook and State of Illinois, have invented certain new and useful Improvements in Flexible Couplings, of which the following is a description, reference being had to the accompanying drawings, which form a part of my specification.

My invention relates to coupling mechanism, more especially intended as shaft couplings, whereby a flexible connection will be provided intermediate of a power-imparting element or shaft and a driven element or shaft; the coupling being adapted to "take up" the thrusts or shocks encountered by one shaft and prevent the transmission thereof to the other element or shaft.

My invention, as disclosed in the drawings, has the further object of providing a flexible connection whereby the impulses of either shaft will be "taken up" or absorbed; while at the same time a complete "setting" of the flexible elements of the coupling will be prevented.

The invention is especially adapted for use on motor-driven vehicles, where it may be employed at any convenient point, as for example intermediate of the transmission mechanism and the differential gearing so that the shocks or abnormal impulses encountered by the one element or shaft-section will not be imparted to the other element or shaft-section.

The purposes of the invention and advantages of the construction will be more fully comprehended from the detailed description of the accompanying drawings, wherein:—

Figure 1 is a perspective view of my improved coupling shown applied to the adjacent ends of two shaft-sections.

Fig. 2 is a detail perspective view illustrating one of the shaft-receiving or engaging members of the coupling.

Fig. 3 is a detail perspective view of the other shaft-receiving or engaging member.

Fig. 4 is a side elevation of the flexible coupler, as disclosed in Fig. 1.

Fig. 5 is a sectional view, taken on the line 5—5 of Fig. 4, looking in the direction of the arrows.

Fig. 6 is a detail view of an end of one of the shaft-receiving or engaging elements.

The invention, in its particular exemplification, comprises a pair of shaft-receiving or engaging members or spiders 10 and 11; the hubs of the members being adapted to receive and be secured to the adjacent ends of two shafts; for example, member 10 may be keyed or suitably secured to the drive or power-imparting element or shaft-section 12 so as to positively rotate therewith; while the hub of member 11 is adapted to be keyed or otherwise suitably secured to the driven element or power-receiving shaft-section 13. The hubs of the two members are provided with suitable key-ways, as shown at 14 and 15, respectively, (see Figs. 3 and 2) whereby said members are rigidly secured to their respective shaft-sections. The hubs of the two members are of comparative width so as to provide sufficient bearing for the ends of the shafts; with the hub of member 11 shown slightly longer so as to receive the protruding end of the power-imparting shaft-section 12, as disclosed in Fig. 5. The power-imparting shaft 12, however, is free to rotate in the hub of member 11, but is held against longitudinal movement by means of a suitable pin shown at 16 disposed transversely through the hub of member 11 and extending into a groove 17 formed in the end of the power-imparting shaft-section 12. By means of this construction, it is apparent that the two members 10 and 11 of the coupler will be held in proper juxtaposition so that improper or accidental separation of the coupler is made impossible.

The radially disposed arm-portions of the members 10 and 11 may be similar in construction and are shown terminating at their outer ends in the enlarged portions or heads 18. The head-portions 18 are preferably of comparative thickness and disposed at right angles to the arms: with the heads provided with openings extending lengthwise therethrough, namely in the direction of rotation of the members. The openings or passages in the heads 18 are adapted to receive an annular member or ring 19. The heads 18, or at least the passages or openings extending therethrough, are made arcuate to describe the arc of the circle described by the annular member or ring 19, so as to permit free movement of the members 10 and 11 on the annular members or ring and relative to each other. The head-portions 18 are preferably shown somewhat cylindrical in shape so as to adapt them to extend about or encircle the member or ring 19; with one side of the head-portions, however, being cut away or slotted, as shown at 20, to permit of the sidewise insertion of the ring 19 into the openings in the head-portions when the coupling is being assembled.

Before the annular member or ring 19 is inserted in the holes or openings in the head-portions of the members 10 and 11, it is provided with a number of coil-springs 21 and 22 which are alternately "threaded" on the ring or annular rod 19 and each spring adapted to come intermediate of the opposing sides or surfaces of the heads or ends of the two members 10 and 11.

In practice, a suitable bar or rod of proper length, and preferably round in cross-section, is bent into circular or ring-form, as shown, when the springs 21 and 22 are placed or alternately "threaded" on the circular rod. With the desired number of springs, preferably four in number, as shown, having been placed on the ring, the adjacent ends of the member or ring 19 are then preferably welded or otherwise secured together so as to provide an endless member or continuous ring.

As previously stated and as shown, the coupler is provided with four springs, preferably of two different lengths; that is the two springs 21 are preferably made of greater length than the two springs 22; the springs 21 and 22 being arranged alternately on the annular member or ring, so that the springs of similar length will be disposed at diametrically opposite points, as shown in Fig. 4. In practice, the coupler is assembled so as to have the long springs 21 disposed in advance of the arms of the member connected to the power-imparting shaft, namely in advance of the arms of member 10, relative to the direction of rotation of the power-imparting shaft 12; that is to say, with the shaft 12 rotating in unclockwise direction in Fig. 1, member 10, will therefore rotate in similar direction, so that a long spring 21 is placed in advance of the ends of both arms of member 10 on the ring 19, thereby causing the power to be yieldingly transmitted to the ends of the arms of member 11 and hence to driven-shaft 13.

The sides of the heads or end-portions 18 of the two members 10 and 11 are shown socketed or counter-bored so as to provide a pocket for the ends of the springs, as shown at 23 in Fig. 6.

The abutting sides of the hub-portions of both members 10 and 11 are shown provided with segmental sockets or cut-away portions, preferably at diametrically opposite points so as to receive the remaining segmental portions of the hub, namely the projecting portions or lugs 24 of the hub of the adjacent member; that is to say, the segmental cut-away portions or sockets of member 10 will receive the protruding portions 24 of member 11; while member 11, which is similarly constructed, will receive the projecting portions of the hub of member 10 and thus provide an interlocking relation between the two members under certain conditions. The cut-away portions or sockets of both members, however, are of greater dimensions or length than the length or dimensions of the protruding portions or lugs 24, so that in the normal condition of the coupler, the extensions 24 of the one member will not be in abutting relation with the extending portions 24 of the other member, but will leave an intervening space, as indicated at 25 in Fig. 1.

The space 25, intermediate of the adjacent intermeshing lugs of the hubs of both members 10 and 11, is such that the projections 24 of the member 10 will come into contact with the projections 24 of the other member 11 slightly in advance of the moment where the springs would become completely compressed or "set" by the variance of rotative movement of the one member relative to the degree of movement of the other member; that is to say, the space between the opposing or interlocking lugs or projections 24 of the members 10 and 11 is such as not to interfere (under normal conditions commensurate with the strength of the respective springs) with the flexible connection between the shafts and therefore with the flexible or yielding transmission of power from one shaft to the other. The lugs 24 on the two members 10 and 11 are merely intended to come into interlocking relation under excessive conditions which would cause complete compression or "setting" of the springs.

The sockets or cut-away portions 20 in the sides of the heads or ends of the two members 10 and 11 are of such dimensions as to permit the ready insertion of the annular member or ring 19, as can more clearly be seen in Fig. 5, and also permit a free sliding relation between the arms and the annular member or ring.

In practice, the member or ring 19 is preferably made of a rod of suitable metal, preferably circular in cross-section, which is bent into ring-form, and before the ends are secured together, the springs 21 and 22 are "threaded" thereon in the alternate relation disclosed in the drawings, after which the ends of the ring are preferably welded together. The ring with the springs is then inserted through the slots 20 in the sides of the head-portions or ends of the arms of the member 10 for example, with springs 21 and 22 disposed on opposite sides of the heads of each arm of member 10. With the ends of the springs seated in the sockets 23, formed in the sides of the heads, the springs will maintain the assembled relation between member 10 and annular member 19, until member 11 has been brought into operative relation with the mechanism; it being understood, of course, that the slots 20 in the sides of the heads of member 11 are disposed in the opposite direction to the slots 20 in the sides of the heads or ends of member 10, thus enabling the member 11 to be readily brought into operative relation with the other elements of the coupling mechanism, after the same have been keyed or otherwise secured to the drive or power-imparting shaft-section; the ends of the arms of member 11 being disposed intermediate of the adjacent ends of springs 21 and 22.

The springs are preferably of such length that they will be under slight compression intermediate of the sides of the heads of the two members when the coupler is in normal condition.

The long springs 21, as described, are disposed in advance of the ends of the arms of the member secured to the drive-shaft, relative to the direction of rotative movement of said shaft, so as to yieldingly transmit the power from said shaft to the member secured on the driven member or shaft; while the short springs 22 are disposed rearwardly of the ends of the arms of the member secured to the drive-shaft so as to take up any "back lash" and also yieldingly transmit the reverse movement of the one shaft to the other. The ring-member 19 tends to maintain the springs in positive or direct alinement with the arms of the two members and prevents any buckling or sidewise movement of the springs. The ends of the arms of both members 10 and 11 are so formed as to have the head-portions 18 disposed substantially in the same circumferential plane, so that pressure may be yieldingly transmitted in a direct line from one member to the other; the construction being such that the ends of the two shafts 12 and 13 will be maintained in alinement and the shafts be operatively secured together by resilient or flexible means which is adapted to yieldingly transmit the power from the power-shaft through the coupler to the driven-shaft without imparting the detrimental and undesirable impulses or shocks; while at the same time undue and abnormal loads may be transmitted from one shaft to the other without injury to the flexible elements of the coupler.

I have shown and described what I believe to be the simplest and best form of my invention, which, however, may have expression in somewhat different mechanical form without departing from the spirit of the invention as set forth in the accompanying claims.

What I claim is:—

1. A flexible coupling, comprising a pair of members adapted to be secured to the adjacent ends of two rotatable shafts so as to rotate therewith, both members being provided with radially disposed arms, the ends whereof are provided with circumferentially disposed slots, a circular member adapted to be seated in the slots of both members and permit sliding relation therewith, and a plurality of coil-springs mounted on said endless member, each spring being adapted to be placed under compression intermediate of an arm of each member so that rotative movement of one member will be yieldingly transmitted to the other member.

2. A flexible coupling, comprising a pair of members, adapted to be fixedly secured to the adjacent ends of two rotative shafts so as to rotate therewith, both members being provided with radially disposed arms formed so as to present the ends of the arms of both members in substantially the same circumferential plane, with the end of each arm provided with a circumferentially disposed slot, the slots in the ends of the arms of one member facing in the opposite direction from the slots in the ends of the arms of the other member, an endless member adapted to be seated in the slots of both members and permit sliding relation therewith, and a plurality of coil-springs encircling said endless member, each spring being adapted to be placed under compression intermediate of the arm of one member and the arm of the other member so that rotative movement of one member will be yieldingly transmitted to the other member.

3. A flexible coupling, comprising a pair of members, each of which is provided with radially disposed arms, each of said members being adapted to be fixedly secured to the adjacent end of two alined rotatable shafts so as to rotate with its respective shaft, the ends of the arms of both members being provided with slots, the slots in the arms of one member facing in the opposite direction from the slots in the arms of the other member, an endless member adapted to be seated in the slots in the arms of both members and permit a sliding relation therewith, a plurality of coil-springs encircling said endless member, each spring being adapted to be placed under compression intermediate of the arm of one member and the arm of the other so that rotative movement of one member will be yieldingly transmitted to the other member, and means intermediate of the first mentioned members whereby positive rotative relation between said members will be provided in advance of the moment of complete compression of said springs.

4. A flexible coupling, comprising a pair of members having hub portions adapted to receive the ends of rotatable shafts and be secured thereto so as to rotate with their respective shafts, each hub portion being provided with a pair of radially disposed arms formed so as to permit the ends of the arms of both members to be disposed in the same circumferential plane, the ends of the arms of both members being provided with transversely disposed slots, an endless member arranged in said slots and in sliding relation with the arms of both members, a plurality of coil-springs encircling said endless member, each spring being placed under compression intermediate of the arm of one member and the arm of the other member so that rotative movement of one member will be yieldingly transmitted to the other member, and protruding portions provided on the adjacent sides of the hubs of the first mentioned members adapted to form interlocking relation between the hubs of both members after the springs have been compressed to a predetermined extent.

5. A flexible coupling, comprising a pair of shaft-receiving members, each of which is provided with a pair of radially disposed arms terminating in bearing surfaces, a plurality of coil-springs disposed between the bearing surfaces of the adjacent arms of both members so that the rotative movement of one member will be yieldingly transmitted to the other member, the shaft-receiving members being provided with portions projecting into the same circumferential plane and adapted to form interlocking relation between said members after said springs are compressed to a predetermined degree.

6. A flexible coupling, comprising a pair of shaft-receiving hubs, each hub being provided with a pair of radially disposed arms terminating in bearing surfaces at the outer ends thereof adapted to be disposed in the same circumferential plane, a plurality of coil-springs arranged on opposite sides of the bearing surfaces of each arm and intermediate of the arms of both members so that rotative movement of either member will be yieldingly transmitted to the other member, means whereby the springs will be maintained in circumferential alinement with the arms of said members, and means intermediate of said shaft-receiving hubs whereby interlocking relation between the hubs will be effected and compression of the springs beyond a predetermined degree prevented.

7. A flexible coupling, comprising a pair of shaft-receiving hub-members, each hub-member being provided with radially disposed arms terminating at their ends in bearing surfaces adapted to extend into the same circumferential plane, a plurality of coil-springs disposed intermediate of the bearing surfaces of adjacent arms of different hub-members, means whereby said springs will be maintained in circumferential alinement with said arms so that the rotative movement of one hub-member will be yieldingly transmitted to the other hub-member, the adjacent sides of the hub-members being provided with correlated portions adapted to provide interlocking relation between the hub-members after the springs are compressed to a predetermined degree.

8. A flexible coupling, comprising a pair of members, each of which is adapted to be secured to the adjacent ends of two rotatable shafts so as to rotate with their respective shafts, both members being provided with radially disposed portions, with the outer ends of the radially disposed portions of both members adapted to be disposed in the same circumferential plane when said members are secured to their respective shaft-ends, a plurality of coil-springs mounted intermediate of said portions of both members so that the rotative movement of the one member will be yieldingly transmitted through certain of the springs to the other member, and means intermediate of the members whereby positive interlocking relation between said pair of members is effected when said springs have been compressed to a predetermined degree.

9. A flexible coupling, comprising a pair of members, each of which is adapted to be secured to the adjacent ends of two rotatable shafts, said members being provided with radially disposed portions provided with circumferentially disposed slots, coil-springs disposed intermediate of the radially disposed portions of the one member and the radially disposed portions of the other member so as to yieldingly transmit rotative movement of the one member to the other member through said springs, a circular member adapted to be seated in said circumferentially disposed slots and having sliding engagement with the radially disposed portions of both members, said circular member being adapted to maintain the springs in circumferential alinement with the radially disposed portions of both members, the adjacent sides of said pair of members being provided with overlapping projections adapted to form interlocking relation between said members after the springs have been compressed to a predetermined extent.

IRVIN HUPP.

Witnesses:
GEORGE HEIDMAN,
F. A. FLORELL.